United States Patent
Hoshiba et al.

(10) Patent No.: US 10,741,842 B2
(45) Date of Patent: *Aug. 11, 2020

(54) SOLID-STATE BATTERY

(71) Applicant: Samsung Electronics Co., Ltd., Suwon-si, Gyeonggi-do (KR)

(72) Inventors: Koji Hoshiba, Kanagawa (JP); Satoshi Fujiki, Kanagawa (JP); Takanobu Yamada, Kanagawa (JP); Yuichi Aihara, Kanagawa (JP)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 1412 days.

This patent is subject to a terminal disclaimer.

(21) Appl. No.: 14/098,571

(22) Filed: Dec. 6, 2013

(65) Prior Publication Data

US 2014/0162139 A1    Jun. 12, 2014

(30) Foreign Application Priority Data

Dec. 7, 2012 (JP) ................................ 2012-268537
Aug. 26, 2013 (KR) ........................ 10-2013-0101289

(51) Int. Cl.
*H01M 4/62* (2006.01)
*H01M 10/0525* (2010.01)
*H01M 10/0562* (2010.01)
*H01M 4/133* (2010.01)
*H01M 4/134* (2010.01)

(52) U.S. Cl.
CPC .......... *H01M 4/622* (2013.01); *H01M 4/133* (2013.01); *H01M 4/134* (2013.01); *H01M 4/623* (2013.01); *H01M 10/0525* (2013.01); *H01M 10/0562* (2013.01)

(58) Field of Classification Search
CPC .............. H01M 10/02; H01M 10/052; H01M 10/0562; H01M 4/02; H01M 4/13
USPC ........................................................... 429/322
See application file for complete search history.

(56) References Cited

U.S. PATENT DOCUMENTS

| | | | |
|---|---|---|---|
| 10,008,716 B2 * | 6/2018 | Abdelsalam | H01M 4/133 |
| 2001/0016290 A1 | 8/2001 | Kezuka | |
| 2003/0215716 A1 * | 11/2003 | Suzuki | H01M 4/0404 |
| | | | 429/232 |

(Continued)

FOREIGN PATENT DOCUMENTS

| DE | 102011011155 | * | 8/2012 | ............. H01G 11/28 |
|---|---|---|---|---|
| GB | 2507535 B | | 7/2015 | |

(Continued)

OTHER PUBLICATIONS

Korean Office Action for Korean Patent Application No. 10-2013-0101289 dated Sep. 19, 2019.

*Primary Examiner* — Ladan Mohaddes
(74) *Attorney, Agent, or Firm* — Cantor Colburn LLP

(57) ABSTRACT

A solid-state battery including a cathode, an anode, and a solid-state electrolyte layer including a solid-state electrolyte, wherein the solid-state electrolyte layer is disposed between the cathode and the anode, wherein the anode includes an anode active material, a first binder, and a second binder, the first binder is inactive to the solid-state electrolyte, the second binder has a tensile modulus greater than a tensile modulus of the first binder, and the second binder has a binding force which is greater than a binding force of the first binder.

19 Claims, 1 Drawing Sheet

(56) References Cited

U.S. PATENT DOCUMENTS

| | | |
|---|---|---|
| 2004/0188880 A1 | 9/2004 | Bauer et al. |
| 2006/0105242 A1* | 5/2006 | Sato ............... H01M 4/13 429/231.95 |
| 2008/0160406 A1* | 7/2008 | Kato et al. ................. 429/217 |
| 2009/0053607 A1 | 2/2009 | Jeong et al. |
| 2009/0081553 A1* | 3/2009 | Kondo ............... H01M 2/021 429/314 |
| 2010/0015521 A1* | 1/2010 | Kim ............... C01G 45/1228 429/163 |
| 2010/0055565 A1 | 3/2010 | Naoi et al. |
| 2010/0291442 A1* | 11/2010 | Wang et al. ............ 429/231.95 |
| 2011/0177370 A1* | 7/2011 | Kawamoto ...... H01M 10/0565 429/94 |
| 2011/0269857 A1* | 11/2011 | Lee et al. ....................... 521/55 |
| 2011/0318590 A1* | 12/2011 | Maki ................... B32B 7/12 428/461 |
| 2012/0276455 A1* | 11/2012 | Nishimura ........... H01M 4/621 429/232 |
| 2013/0017434 A1* | 1/2013 | Shimizu ................ H01M 4/13 429/156 |
| 2013/0065119 A1 | 3/2013 | Sanada |
| 2014/0044888 A1* | 2/2014 | Schaefer ............... H01G 11/28 427/553 |
| 2014/0054492 A1* | 2/2014 | Mukai ................. H01M 4/136 252/182.1 |

FOREIGN PATENT DOCUMENTS

| | | |
|---|---|---|
| JP | 05013099 A | 1/1993 |
| JP | 09082311 A | 3/1997 |
| JP | 10125330 A | 5/1998 |
| JP | 11-167921 A | 6/1999 |
| JP | 2001516496 A | 9/2001 |
| JP | 2002246029 A | 8/2002 |
| JP | 2008103282 A | 5/2008 |
| JP | 2008257962 A | 10/2008 |
| JP | 2009-054484 A | 3/2009 |
| JP | 2009-129914 A | 6/2009 |
| JP | 2009224239 A | 10/2009 |
| JP | 2009289534 A | 12/2009 |
| JP | 2010-003703 A | 1/2010 |
| JP | 201061912 A | 3/2010 |
| JP | 2010-257878 A | 11/2010 |
| JP | 2010-282815 A | 12/2010 |
| JP | 2011-076792 A | 4/2011 |
| JP | 2011134675 A | 7/2011 |
| JP | 2011-204592 A | 10/2011 |
| JP | 5002824 B1 * | 8/2012 ............ H01M 4/136 |
| JP | 2013-045598 A | 3/2013 |
| KR | 1998-0012686 | 4/1998 |
| KR | 1020040036459 A | 4/2004 |
| KR | 1020090030026 A | 3/2009 |

* cited by examiner

SOLID-STATE BATTERY

RELATED APPLICATIONS

This application claims priority to and the benefit of Japanese Patent Application No. 2012-268537, filed on Dec. 7, 2012, and Korean Patent Application No. 10-2013-0101289, filed on Aug. 26, 2013, and all the benefits accruing therefrom under 35 U.S.C. §119, the contents of which are incorporated herein in their entirety by reference.

BACKGROUND

1. Field

The present disclosure relates to a solid-state battery. The solid-state battery may be a lithium-ion secondary battery, or the like.

2. Description of the Related Art

A lithium-ion secondary battery can be a solid-state battery using a solid-state electrolyte. The solid-state battery may include an electrolyte layer including a solid-state electrolyte, electrodes (cathode and anode) formed on opposite surfaces of the electrolyte layer, and current collectors that are respectively bonded to the electrodes. In the solid-state battery, in general, since the solid-state electrolyte is used as an electrolyte, the solid-state electrolyte is also mixed in each electrode.

A method of preparing a solid-state battery is a method in which powder materials constituting respective layers are sequentially introduced into a cylindrical container and ground and molded with pressure, and ends of the container are then blocked with current collectors, i.e., a preparation method by powder compression molding. However, in the preparation method by powder compression molding, since a container and a pressure device that correspond to a size of an electrode area (i.e., an area in which the electrode is in contact with the electrolyte layer) is used, it may be difficult to increase the size of the electrode area. Therefore, powder compression molding may not be suitable for the preparation of a high capacity solid-state battery, which is currently in demand.

Another method of preparing a solid-state battery has been proposed in which a coating solution of each layer is formed by mixing a powder material of each layer, a binder, and a solvent, a stack is then formed by sequentially coating the coating solutions on current collectors and drying, and the stack is rolled, to provide a preparation method by coating. With respect to the preparation method by coating, since the electrode area may be increased by enlargement of a coating area of the electrodes and electrolyte layer, the electrode area may be easily increased.

Nonetheless, there remains a need for an improved solid-state battery.

SUMMARY

Provided is a solid-state battery having improved lifetime characteristics.

Additional aspects will be set forth in part in the description which follows and, in part, will be apparent from the description.

According to an aspect, a solid-state battery includes a cathode; an anode; and a solid-state electrolyte layer including a solid-state electrolyte, wherein the solid-state electrolyte is disposed between the cathode and the anode, wherein the anode includes an anode active material, a first binder, and a second binder, the first binder is inactive to the solid-state electrolyte, and the second binder has a binding force which is greater than a binding force of the first binder.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
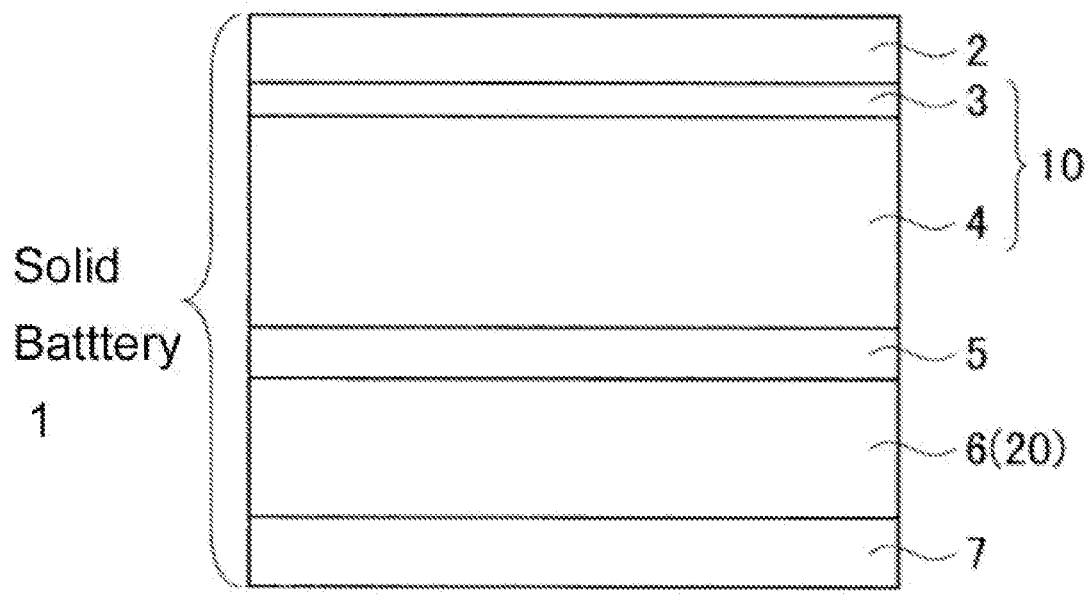
FIG. 1 is a cross-sectional view illustrating a structure of an embodiment of a solid-state battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" as used herein means a straight or branched chain, saturated, monovalent hydrocarbon group (e.g., methyl or hexyl).

"Aryl" means a monovalent group formed by the removal of one hydrogen atom from one or more rings of an arene (e.g., phenyl or napthyl).

The prefix "hetero" means that the compound or group includes at least one a heteroatom (e.g., 1, 2, or 3 heteroatom(s)), wherein the heteroatom(s) is each independently N, O, S, Si, or P.

"Substituted" means that the compound or group is substituted with at least one (e.g., 1, 2, 3, or 4) substituent independently selected from a hydroxyl (—OH), a C1-9 alkoxy, a C1-9 haloalkoxy, an oxo (=O), a nitro (—NO$_2$), a cyano (—CN), an amino (—NH$_2$), an azido (—N$_3$), an amidino (—C(=NH)NH$_2$), a hydrazino (—NHNH$_2$), a hydrazono (=N—NH$_2$), a carbonyl (—C(=O)—), a carbamoyl group (—C(O)NH$_2$), a sulfonyl (—S(=O)$_2$—), a thiol (—SH), a thiocyano (—SCN), a tosyl (CH$_3$C$_6$H$_4$SO$_2$—), a carboxylic acid (—C(=O)OH), a carboxylic C1 to C6 alkyl ester (—C(=O)OR wherein R is a 01 to 06 alkyl group), a carboxylic acid salt (—C(=O)OM) wherein M is an organic or inorganic anion, a sulfonic acid (—SO$_3$H$_2$), a sulfonic mono- or dibasic salt (—SO$_3$MH or —SO$_3$M$_2$ wherein M is an organic or inorganic anion), a phosphoric acid (—PO$_3$H$_2$), a phosphoric acid mono- or dibasic salt (—PO$_3$MH or —PO$_3$M$_2$ wherein M is an organic or inorganic anion), a C1 to C12 alkyl, a C3 to C12 cycloalkyl, a C2 to C12 alkenyl, a C5 to C12 cycloalkenyl, a C2 to C12 alkynyl, a C6 to C12 aryl, a C7 to C13 arylalkylene, a C4 to C12 heterocycloalkyl, and a C3 to C12 heteroaryl instead of hydrogen, provided that the substituted atom's normal valence is not exceeded.

"Inactive" as used herein means unable to intercalate or deintercalate lithium under conditions present in a lithium battery.

Hereinafter, a solid-state battery according to exemplary embodiments will be described in more detail.

A method of using a silicon-based active material in an anode has been examined in order to prepare a high capacity lithium-ion battery. At present, graphite is primarily used as an anode active material. However, the capacity thereof is only a fraction of that of the silicon-based active material. Although the capacity of the silicon-based active material is high, the expansion and contraction of the silicon-based active material may be large during charge and discharge of the battery.

Since the adhesion of an interface between the anode and a solid-state electrolyte, or the adhesion of an interface between the anode and an anode current collector is affected by the expansion and contraction of the silicon-based active material, and in particular, since a lithium-ion secondary battery using a sulfide-based solid-state electrolyte has a low overvoltage for a reduction reaction causing the precipitation of lithium metal, the generation of dendrites may be facilitated by a resistance distribution due to an interfacial resistance in the solid-state battery, which can result in an internal short-circuit failure. Therefore, since the lifetime of the battery significantly decreases, an anode active material, in which a portion of graphite is mixed with the silicon-based active material, is currently used.

Japanese Patent Application Laid-Open Publication No. 2011-204592, the content of which is incorporated herein by reference in its entirety, discloses a lithium-ion secondary battery having an inorganic solid-state electrolyte, such as LiI and Li$_3$N. However, Japanese Patent Application Laid-Open Publication No. 2011-204592 does not provide a solution for the problem of delamination at an interface between the solid-state electrolyte and the anode, which may occur due to the expansion and contraction of the anode active material during charge and discharge of the battery when a silicon-based material is used in the anode active material.

As a result of a significant amount of research, it has been surprisingly found that adhesion at an interface of the anode may be significantly improved by appropriately selecting a plurality of binders when the silicon-based active material is used in the anode, and thus, a solid-state battery having an improved lifetime may be provided.

That is, a solid-state battery according to an embodiment includes a cathode; an anode; and a solid-state electrolyte layer comprising a solid-state electrolyte and disposed between the cathode and the anode, wherein the anode includes an anode active material, a first binder, and a second binder, the first binder is inactive to the solid-state electrolyte, the second binder has a tensile modulus greater than a tensile modulus of the first binder, and the second binder has a binding force which is greater than that of the first binder.

As used herein, "binding force" refers to binding at an interface between the binder composition and the anode. The binding force of the binder, for example, can be determined by measuring a force required to delaminate a film of the binder, which may be obtained by coating an anode current collector with a binder solution and drying, from the anode current collector with a commercial peel tester.

The second binder may comprise a highly elastic resin, such as a polyimide, as a second a binder for an anode. The highly elastic resin may stably maintain the adhesion at an interface of the anode (i.e., an interface between the anode and the solid-state electrolyte, and/or an interface between the anode and the anode current collector) by constraining the expansion and contraction of the anode active material during charge and discharge. Further, since the binder for an anode also includes the first binder that binds the solid-state electrolyte and is inactive to the solid-state electrolyte, the adhesion at the interface between the anode and the solid-state electrolyte may be further improved. Therefore, the adhesion at the interface between the anode and the solid-state electrolyte as well as the adhesion at the interface between the anode and the anode current collector may be stably maintained, regardless of the expansion and contraction of the anode active material during charge and discharge.

A tensile modulus of the second binder in the solid-state battery may be in a range of about 2 gigaPascals (GPa) to about 15 GPa. The highly elastic resin is a resin having the above range of tensile modulus. The tensile modulus is defined as tensile stress/tensile strain. The tensile modulus may be measured in accordance with JIS K7162, the content of which is incorporated herein by reference in its entirety. Examples of the highly elastic resin, i.e., the second binder, may be polyimide, polyamide, and polyimideamide.

The second binder in the solid-state battery may be a polar resin including a polar functional group, e.g., an imide group or an amide group. Since the second binder includes the polar functional group, the adhesion at the interface between an anode, e.g., an anode layer, and the anode current collector may be improved. The anode may comprise, or consist of, the anode layer.

The second binder in the solid-state battery may include a polyimide that is expressed by Chemical Formula 1 below.

Chemical Formula 1

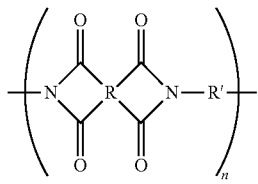

wherein n is about 50 to about 5,000, and R and R' are aromatic groups, for example C6 to C30 aromatic groups.

R and R' may each independently be of the formula Ar-X-Ar, Ar-X-Ar-X-Ar, or Ar, wherein Ar is a substituted or unsubstituted C6 to C30 aryl group, or a substituted or unsubstituted C6 to C20 heteroaryl group, and each X may independently be a single bond, —O—, or —C(=O)—, a divalent group, or a tetravalent group.

For example, Ar may be a phenylene group, biphenylene group, or naphthylene group.

For example, R may have the following Chemical Formulas 1A to 1D,

Chemical Formula 1A-1D

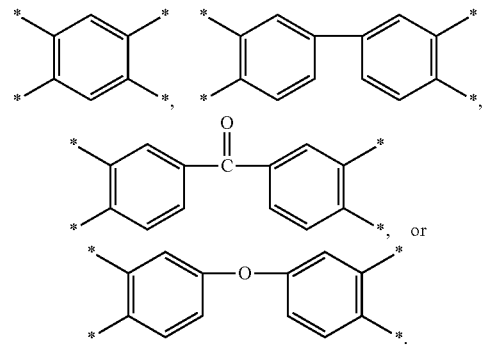

and R' may have the following Chemical Formulas 1E-1H,

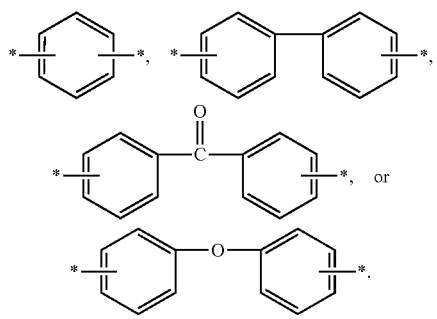

For example, the second binder in the solid-state battery may include polyimide that is expressed by Chemical Formula 2 below.

Chemical Formula 2

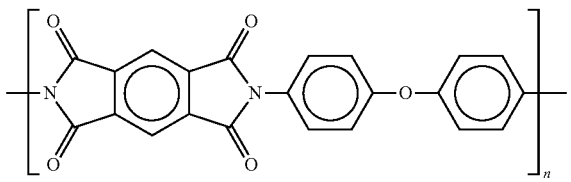

wherein n is about 50 to about 5,000.

An amount of the second binder in the solid-state battery may be in a range of about 1 wt % to about 10 wt %, based on a total weight of the anode layer. Improved lifetime characteristics of the lithium battery may be obtained when the amount of the second binder is in the above range.

The first binder in the solid-state battery may be a non-polar thermoplastic resin that does not include a polar functional group. For example, the first binder may comprise a styrene-butadiene block copolymer, a styrene-ethylene-butadiene-styrene block copolymer, a styrene-styrene butadiene-styrene block copolymer, a styrene-butadiene rubber, a butadiene rubber, a natural rubber, an isoprene rubber, an ethylene-propylene-diene terpolymer, polystyrene, polyolefin, polycycloolefin, a silicone resin, a partially or fully hydrogenated products thereof, or a combination thereof. However, the first binder is not necessarily limited thereto, and any suitable binder that is usable as a non-polar thermoplastic resin in the art may be used.

An amount of the first binder in the solid-state battery may be in a range of about 0.1 wt % to about 2 wt %, based on the total weight of the anode layer. Improved lifetime characteristics of the lithium battery may be obtained when the amount of the first binder is within the above range.

In the solid-state battery, the amount of the second binder may be greater than that of the first binder. For example, the amount of the second binder may be in a range of about 50 wt % to about 99 wt %, based on a total weight of the first binder and the second binder. For example, the amount of the second binder may be in a range of about 60 wt % to about 99 wt %, based on the total weight of the first binder and the second binder. For example, the amount of the second binder may be in a range of about 70 wt % to about 99 wt %, based on the total weight of the first binder and the second binder. For example, the amount of the second binder may be in a range of about 80 wt % to about 99 wt %, based on the total weight of the first binder and the second binder. For example, the amount of the second binder may be in a range of about 85 wt % to about 99 wt %, based on the total weight of the first binder and the second binder.

The anode active material in the solid-state battery may include a graphite-based material, a metal-based material, or a combination thereof. For example, the anode active material may include a silicon-based material. The silicon-based material may be silicon, a silicon alloy, or silicon oxide.

In the solid-state battery, the anode may not include a solid-state electrolyte. For example, the anode may not include a sulfide-based solid-state electrolyte. The anode may provide excellent battery characteristics, even in a case where the anode does not include the solid-state electrolyte.

The solid-state electrolyte layer in the solid-state battery may include a sulfide-based solid-state electrolyte. For example, the sulfide-based solid-state electrolyte may include $Li_2S$—$P_2S_5$. High ionic conductivity may be obtained by including the sulfide-based solid-state electrolyte.

The solid-state electrolyte layer in the solid-state battery may include the first binder. That is, the solid-state electrolyte layer may include a non-polar thermoplastic resin that does not include a polar functional group.

The solid-state battery may further include an adhesive layer disposed between the cathode current collector on the cathode and the cathode. The adhesion between the cathode and the cathode current collector may be improved by the adhesive layer.

The adhesive layer in the solid-state battery may include the first binder and a third binder, wherein the first binder is inactive to the solid-state electrolyte and the third binder has a higher binding force than a binding force of the first binder.

For example, the third binder may comprise a nitrile rubber, a chloroprene rubber, a polyacrylic acid ester copolymer, polyvinylidene fluoride, a vinylidene fluoride-hexafluoropropylene copolymer, chlorinated polyethylene, a polymethacrylic acid ester, polyvinyl alcohol, an ethylene-vinyl alcohol copolymer, polyimide, polyamide, polyamideimide, a partially or fully hydrogenated products thereof, a carboxylic acid modified product thereof, or a combination thereof.

Hereinafter, the solid-state battery will be described in more detail with reference to the accompanying drawings.

1. Configuration of Solid-state Battery

First, a configuration of a solid-state battery 1 according to an embodiment is described with reference to FIG. 1. The solid-state battery 1 includes a cathode current collector 2, an adhesive layer 3, a cathode layer 4, a solid-state electrolyte layer 5, an anode comprising an anode layer 6, and an anode current collector 7. A cathode 10 of the solid-state battery 1 comprises the adhesive layer 3 and the cathode layer 4. Also, the solid-state battery 1 may not include the adhesive layer 3.

The cathode current collector 2 may be comprise any suitable conductor, and for example, may comprise aluminum, stainless steel, nickel plated steel, or a combination thereof.

The adhesive layer 3 is for binding the cathode current collector 2 and the cathode layer 4. The adhesive layer 3 may include an adhesive layer conductive material, a first binder, and a third binder. Examples of the adhesive layer conductive material may be carbon black such as Ketjen black and acetylene black, graphite, natural graphite, and artificial graphite. However, the adhesive layer conductive material is not particularly limited so long as it increases the conductivity of the adhesive layer 3, and the adhesive layer conductive material may be used alone or in a combination of a plurality of adhesive layer conductive materials.

The first binder, for example, may be a non-polar resin that does not have a polar functional group. Therefore, the first binder is inactive to a highly reactive solid-state electrolyte, particularly, a sulfide-based solid-state electrolyte. It is known that the sulfide-based solid-state electrolyte is active to a functional group having a polar structure, such as acids, alcohols, amines, and ethers. The first binder is for bonding to the cathode layer 4, and when the first binder or the same component as the first binder is included in the cathode layer 4, the first binder in the adhesive layer 3 may be strongly bonded to the cathode layer 4 by interdiffusion with the first binder in the cathode layer 4 through an interface between the adhesive layer 3 and the cathode layer 4. Therefore, the first binder may be included in the cathode layer 4.

Examples of the first binder may be a styrene-based thermoplastic elastomer such as a styrene-butadiene block copolymer ("SBS"), a styrene-ethylene-butadiene-styrene block copolymer ("SEBS"), a styrene-styrene butadiene-styrene block copolymer, a styrene-butadiene rubber ("SBR"), a butadiene rubber ("BR"), a natural rubber ("NR"), an isoprene rubber ("IR"), an ethylene-propylene-diene terpolymer ("EPDM"), partially or fully hydrogenated products thereof, or a combination thereof. In addition, examples of the first binder may be polystyrene, polyolefin, an olefin-based thermoplastic elastomer, polycycloolefin, a silicone resin, or a combination thereof. However, the first binder is not necessarily limited thereto, and any non-polar resin that is usable as a non-polar binder in the art may be used.

The third binder is a binder that has better binding ability with respect to the cathode current collector 2 than the first binder. The excellent binding ability of the third binder with respect to the cathode current collector 2, for example, may be determined by measuring a force required to delaminate a binder film, which may be obtained by coating the cathode current collector 2 with a binder solution and drying, from the cathode current collector 2, with a commercial peel tester. The third binder, for example, may be a polar functional group containing resin having a polar functional group, and may be strongly bonded to the cathode current collector 2 via hydrogen bonds. However, since there are many cases where the third binder is highly reactive to the sulfide-based solid-state electrolyte, the third binder is not included in the cathode layer 4.

Examples of the third binder may be a nitrile rubber ("NBR"), a chloroprene rubber ("CR"), a partially or fully hydrogenated products thereof, a polyacrylic acid ester copolymer, polyvinylidene fluoride ("PVDF"), a vinylidene fluoride-hexafluoropropylene copolymer ("VDF-HFP"), a carboxylic acid modified product thereof, a chlorinated polyethylene ("CM"), a polymethacrylic acid ester, polyvinyl alcohol, an ethylene-vinyl alcohol copolymer, polyimide, polyamide, polyamideimide, or a combination thereof. Also, examples of the third binder may be polymers copolymerized with monomers having carboxylic acid, sulfonic acid, or phosphoric acid groups. However, the third binder is not necessarily limited thereto, and any polar resin that is usable as a binder in the art may be used.

Also, a ratio of amounts of the adhesive layer conductive material, the first binder, and the third binder is not particularly limited. For example, the amount of the adhesive layer conductive material is in a range of about 50 wt % to about 96 wt %, based on a total weight of the adhesive layer 3, the amount of the first binder is in a range of about 3 wt % to about 30 wt %, based on the total weight of the adhesive layer 3, and the amount of the third binder is in a range of about 2 wt % to about 20 wt %, based on the total weight of the adhesive layer 3.

The cathode layer 4 may include a sulfide-based solid-state electrolyte, a cathode active material, and a cathode layer conductive material. The cathode layer conductive material may be the same material as the adhesive layer conductive material.

The sulfide-based solid-state electrolyte may include at least lithium sulfide as a first component and may include silicon sulfide, phosphorus sulfide, boron sulfide, or a combination thereof as a second component. In particular, the sulfide-based solid-state electrolyte may be $Li_2S$—$P_2S_5$. The sulfide-based solid-state electrolyte may include a sulfide, such as $SiS_2$, $GeS_2$, $B_2S_3$, or a combination thereof, in addition to $Li_2S$—$P_2S_5$, which can have a higher lithium-ion conductivity than other inorganic compounds. Also, an inorganic solid-state electrolyte, in which an appropriate amount of $Li_3PO_4$, halogen, or a halogen compound is added to an inorganic solid-state electrolyte that is formed by the combination of $Li_2S$—$P_2S_5$, $SiS_2$, $GeS_2$, and $B_2S_3$, may be used as the sulfide-based solid-state electrolyte.

The sulfide-based solid-state electrolyte may be prepared from lithium sulfide and phosphorus pentasulfide ($P_2S_5$); or lithium sulfide, elemental phosphorus, and elemental sulfur; or lithium sulfide, $P_2S_5$, elemental phosphorus and/or elemental sulfur.

Lithium sulfide that is industrially available may be used for preparing the sulfide-based solid-state electrolyte. However, the lithium sulfide may be of high purity.

In the lithium sulfide, a total amount of sulfur oxide in the lithium salt may be about 0.15 wt % or less and for example, may be about 0.1 wt % or less and an amount of lithium N-methylaminobutyrate may be about 0.15 wt % or less and for example, may be about 0.1 wt % or less.

In a case where the total amount of sulfur oxide in the lithium salt (i.e., lithium sulfide) is about 0.15 wt % or less, the solid-state electrolyte, which may be obtained by melt quenching or mechanical milling, may be a glassy solid-state electrolyte (e.g., a completely amorphous material). That is, when the total amount of sulfur oxide in the lithium salt is greater than about 0.15 wt %, a crystallized product having low ionic conductivity may be obtained. Also, since the crystallized product is not changed by a heat treatment, production of a solid-state electrolyte having high ionic conductivity may be avoided.

Further, when the amount of lithium N-methylaminobutyrate is 0.15 wt % or less, a degraded product of lithium N-methylaminobutyrate does not deteriorate cycle performance of the lithium battery.

Therefore, a solid-state electrolyte having high ionic conductivity may be obtained by using the lithium sulfide having reduced impurities.

A method of preparing lithium sulfide ($Li_2S$) that is used in the preparation of a highly ionically conductive solid-state electrolyte is not particularly limited so long as the method may provide a suitably low content of impurities. For example, a method of forming lithium hydrogen sulfide (LiSH) by reacting lithium hydroxide and hydrogen sulfide at a temperature ranging from about 0° C. to about 150° C. in an aprotic organic solvent and subsequently removing hydrogen sulfide ($H_2S$) from the reaction solution at a temperature ranging from about 150° C. to about 200° C., a method of directly forming lithium sulfide by reacting lithium hydroxide and hydrogen sulfide at a temperature ranging from about 150° C. to about 200° C. in an aprotic organic solvent, or a method of reacting lithium hydroxide and a gaseous sulfur source at a temperature ranging from about 130° C. to about 445° C. may be used.

A method of purifying lithium sulfide is not particularly limited. For example, lithium sulfide is cleaned at a temperature of about 100° C. or more by using an organic solvent. The organic solvent used in the cleaning may be a polar aprotic solvent, and the aprotic organic solvent used in the preparation of lithium sulfide and the polar aprotic organic solvent used in the cleaning may also be the same. Examples of the polar aprotic organic solvent used in the cleaning may be polar aprotic organic compounds, such as an amide compound, a lactam compound, a urea compound, an organic sulfur compound, and a cyclic organic phosphorus compound, and a single solvent or a mixed solvent thereof may be appropriately used as the polar aprotic organic solvent. For example, N-methyl-2-pyrrolidone ("NMP") may be selected.

An amount of the organic solvent used in the cleaning is not particularly limited. Also, the number of the cleaning is not particularly limited, but the cleaning may be performed twice or more. The cleaning may be performed under an atmosphere of an inert gas, such as nitrogen and argon.

Lithium sulfide may be prepared by drying the cleaned lithium sulfide above a temperature of a boiling point of the organic solvent used in the cleaning in an inert gas (e.g., nitrogen) atmosphere under atmospheric pressure or reduced pressure for about 5 minutes or more, for example, about 2 hours to about 3 hours or more.

$P_2S_5$ may be used without particular limitation as long as it is industrially manufactured and sold. However, instead of using $P_2S_5$, elemental phosphorus (P) and elemental sulfur (S) having a corresponding molar ratio may be used. The elemental P and elemental S may be used without particular limitation as long as it is industrially manufactured and sold.

A mixed molar ratio of lithium sulfide to phosphorus pentasulfide and/or elemental phosphorus and elemental sulfur may be in a range of about 50:50 to about 80:20, for example, about 60:40 to about 80:20. For example, the mixed molar ratio of $Li_2S:P_2S_5$ may be in a range of about 70:30 to about 80:20.

Also, the sulfide-based solid-state electrolyte may be obtained by a method in which $Li_2S$ and $P_2S_5$ are melt-mixed at a predetermined ratio by heating $Li_2S$ and $P_2S_5$ above melting temperatures thereof and the melt is quenched after holding it for a predetermined time (melt quenching method). Also, the sulfide-based solid-state electrolyte may be obtained by processing $Li_2S$—$P_2S_5$ by a mechanical milling method. The mixed molar ratio of $Li_2S$—$P_2S_5$ may be in a range of about 50:50 to about 80:20, for example, about 60:40 to about 75:25.

An electrolyte of the solid-state battery 1 is composed of a solid-state electrolyte. A lithium ion conductor composed of inorganic compounds may be further included as the solid-state electrolyte in addition to the sulfide-based solid-state electrolyte. Examples of the lithium ion conductor may be $Li_3N$, LISICON, $Li_{3+y}$, $PO_{4-x}N_x$ ("UPON"), $Li_{3.25}Ge_{0.25}P_{0.75}S_4$ ("Thio-LISICON"), and $Li_2O$—$Al_2O_3$—$TiO_2$—$P_2O_5$ ("LATP"). The solid-state electrolyte may be in an amorphous phase, a glass phase, or have a crystalline or glass-ceramic structure.

When the solid-state electrolyte is a sulfide-based solid-state electrolyte comprising $Li_2S$—$P_2S_5$, the lithium-ion conductivity of an amorphous material is about $10^{-4}$ Siemens per centimeter (S/cm). In contrast, the lithium-ion conductivity of a crystalline material is about $10^{-3}$ S/cm.

In each of the cathode and the electrolyte layer, the sulfide-based solid-state electrolyte may comprise a combination of an amorphous material and a crystalline material. The amorphous material may be prepared by mixing precursors of the sulfide-based solid-state electrolyte and processing the precursors by a mechanical milling method. The crystalline material may be prepared by sintering the amorphous material.

Specifically, a method of preparing an amorphous sulfide-based solid-state electrolyte, for example, may include a melt quenching method or a mechanical milling ("MM") method.

In the melt quenching method, predetermined amounts of $P_2S_5$ and $Li_2S$ are mixed in a mortar, and pellets thus prepared from the mixture are then put in a carbon-coated quartz tube and vacuum sealed. Thereafter, the pellets are reacted at a constant temperature and a sulfide-based amorphous material is then obtained by quenching the pellets by putting the quartz tube into ice water.

A reaction temperature during the reaction may be in a range of about 400° C. to about 1,000° C., for example, about 800° C. to about 900° C. A reaction time may be in a range of about 0.1 hours to about 12 hours, for example, about 1 hour to about 12 hours. A quenching temperature of the reaction product may be about 10° C. or less, for example, about 0° C. or less, and a cooling rate thereof may be in a range of about 1 K/sec to about 10,000 K/sec, for example, about 1 K/sec to about 1,000 K/sec.

In a case where the mechanical milling method is used, a sulfide-based amorphous material may be obtained by mixing predetermined amounts of $P_2S_5$ and $Li_2S$ in a mortar and reacting the mixture for a predetermined period of time by using the mechanical milling method.

In the mechanical milling method using the above raw materials, the reaction may be performed at room temperature. Since an amorphous solid-state electrolyte may be prepared at room temperature by the mechanical milling method, the decomposition of the raw materials may not occur, and thus, the amorphous solid-state electrolyte having a charged composition may be obtained. Also, in the mechanical milling method, fine powder of the amorphous solid-state electrolyte may be obtained simultaneously with the preparation of the amorphous solid-state electrolyte.

Various milling devices may be used for the mechanical milling method, and a planetary ball mill may be used.

Since pots used in the planetary ball mill rotate while a table revolves, the planetary ball mill may efficiently generate relatively high impact energy.

Rotation speed and time of the mechanical milling method are not particularly limited. However, since the rotation speed is high, a formation rate of the amorphous solid-state electrolyte may increase, and a conversion rate of the raw materials into the amorphous solid-state electrolyte may increase as the rotation time increases.

For example, when the planetary ball mill is used, the rotation speed used may be in a range of about a few tens to a few hundreds of rpms for about 0.1 hours to about 100 hours.

A crystalline sulfide-based solid-state electrolyte may be obtained by heating the amorphous sulfide-based solid-state electrolyte, which may be prepared by the above-described method, at a high temperature. The heat treatment temperature, for example, may be in a range of about 190° C. to about 340° C., about 195° C. to about 335° C., and about 200° C. to about 330° C. When the heat treatment temperature is lower than about 190° C., a crystalline material having high ionic conductivity may be difficult to obtain, and when the heat treatment temperature is greater than about 340° C., a crystalline material having low ionic conductivity may be generated.

For example, in a case where the heat treatment temperature is in a range of about 190° C. to about 340° C., a heat treatment time may be in a range of about 0.1 hours to about 240 hours, particularly, about 0.2 hours to about 230 hours. For example, when the heat treatment time is less than about 0.1 hours, a crystalline material having high ionic conductivity may be difficult to obtain, and when the heat treatment time is greater than about 240 hours, a crystalline material having low ionic conductivity may be generated.

In the cathode and/or the anode, the formation of pores at an interface between the electrode active material and the solid-state electrolyte during charge and discharge may be prevented by mixing the crystalline solid-state electrolyte with a flexible amorphous solid-state electrolyte.

Since the solid-state electrolyte layer receives only the stress accompanied by volume changes from the cathode and the anode during a charge and discharge process, a volume change of the solid-state electrolyte itself almost does not occur. Therefore, a large amount of the crystalline solid-state electrolyte having higher ionic conductivity than the amorphous solid-state electrolyte may be used in the solid-state electrolyte layer.

Since a large amount of the amorphous solid-state electrolyte is contained in the cathode and/or the anode and the large amount of the crystalline solid-state electrolyte is contained in the solid-state electrolyte layer, the formation of pores at the interface between the active material and the solid-state electrolyte during the charge and discharge process may be prevented while maintaining high lithium-ion conductivity.

A cathode active material is not particularly limited so long as it is a material that may reversibly store and release lithium ions. Examples of the cathode active material may be lithium cobalt oxide ("LCO"), lithium nickel oxide, lithium nickel cobalt oxide, lithium nickel cobalt aluminum oxide (hereinafter, it may also be referred to as "NCA"), lithium nickel cobalt manganese oxide (hereinafter, it may also be referred to as "NCM"), lithium manganate, lithium iron phosphate, nickel sulfide, copper sulfide, sulfur, iron oxide, and vanadium oxide. The cathode active material may be used alone or in a combination thereof.

For example, the cathode active material may be a lithium-containing metal oxides and any suitable cathode active material used in the art may be used without limitation. For example, a composite oxide of cobalt, manganese, nickel, or a combination thereof and lithium may be used, and as particular examples thereof, a compound expressed as one of the following chemical formulas may be used: $Li_aA_{1-b}M_bD_2$ (where $0.90 \le a \le 1$, $0 \le b \le 0.5$); $Li_aE_{1-b}M_bO_{2-c}D_c$ (where $0.90 \le a \le 1$, $0 \le b \le 0.5$, $0 \le c \le 0.05$); $LiE_{2-b}M_bO_{4-c}D_c$ (where $0 \le b \le 0.5$, $0 \le c \le 0.05$); $Li_aNi_{1-b-c}Co_bM_cD_\alpha$ (where $0.90 \le a \le 1$, $0 \le b \le 0.5$, $0 \le c \le 0.05$, $0 < \alpha \le 2$); $Li_aNi_{1-b-c}Co_b M_cO_{2-\alpha}X_\alpha$ (where $0.90 \le a \le 1$, $0 \le b \le 0.5$, $0 \le c \le 0.05$, $0 < \alpha < 2$); $Li_aNi_{1-b-c}Co_bM_cO_{2-\alpha}X_\alpha$ (where $0.90 \le a \le 1$, $0 \le b \le 0.5$, $0 \le c \le 0.05$, $0 < \alpha < 2$); $Li_aNi_{1-b-c}Mn_bM_cD_\alpha$, (where $0.90 \le a \le 1$, $0 \le b \le 0.5$, $0 \le c \le 0.05$, $0 < \alpha \le 2$); $Li_aNi_{1-b-c}Mn_bM_cO_{2-\alpha}X_\alpha$, (where $0.90 \le a \le 1$, $0 \le b \le 0.5$, $0 \le c \le 0.05$, $0 < \alpha < 2$); $Li_aNi_{1-b-c}Mn_bM_cO_{2-\alpha}X_2$ (where $0.90 \le a \le 1$, $0 \le b \le 0.5$, $0 \le c \le 0.05$, $0 < \alpha < 2$); $Li_aNi_bE_cG_dO_2$ (where $0.90 \le a \le 1$, $0 \le b \le 0.9$, $0 \le c \le 0.5$, $0.001 \le d \le 0.1$); $Li_aNi_bCo_cMn_dGeO_2$ (where $0.90 \le a \le 1$, $0 \le b \le 0.9$, $0 \le c \le 0.5$, $0 \le d \le 0.5$, $0.001 \le e \le 0.1$); $Li_aNiG_bO_2$ (where $0.90 \le a \le 1$, $0.001 \le b \le 0.1$); $Li_aCoG_bO_2$ (where $0.90 \le a \le 1$, $0.001 \le b \le 0.1$); $Li_aMnG_bO_2$ (where $0.90 \le a \le 1$, $0.001 \le b \le 0.1$); $Li_aMnG_bO_4$ (where $0.90 \le a \le 1$, $0.001 \le b \le 0.1$); $QO_2$; $QS_2$; $LiQS_2$; $V_2O_5$; $LiV_2O_5$; $LiM'O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above chemical formulas, A is nickel (Ni), cobalt (Co), manganese (Mn), or a combination thereof; M is aluminium (Al), Ni, Co, Mn, chromium (Cr), iron (Fe), magnesium (Mg), strontium (Sr), vanadium (V), rare earth elements, or a combination thereof; D is oxygen (O), fluorine (F), S, P, or a combination thereof; E is Co, Mn, or a combination thereof; X is F, S, P, or a combination thereof; G is Al, Cr, Mn, Fe, Mg, lanthanum (La), cerium (Ce), Sr, V, or a combination thereof; Q is titanium (Ti), molybdenum (Mo), Mn, or a combination thereof; M' is Cr, V, Fe, scandium (Sc), yttrium (Y), or a combination thereof; and J is V, Cr, Mn, Co, Ni, copper (Cu), or a combination thereof.

Examples of the cathode active material may be $LiCoO_2$, $LiMn_xO_{2x}$ (x=1, 2), $LiNi_{1-x}Mn_xO_2$ ($0 < x < 1$), $LiNi_{1-x-y}Co_xMn_yO_2$ ($0 \le x \le 0.5$, $0 \le y \le 0.5$), or $FePO_4$.

A compound having a coating layer on the above-described compounds may be used, or a compound may be used by mixing the above-described compounds and the compound having a coating layer. The coating layer may include a compound of a coating element such as an oxide, hydroxide, oxyhydroxide, oxycarbonate, or hydroxycarbonate of a coating element. The compound constituting the coating layer may be amorphous or crystalline. Examples of the coating element included in the coating layer may be Mg, Al, Co, potassium (K), sodium (Na), calcium (Ca), silicon (Si), Ti, V, tin (Sn), germanium (Ge), gallium (Ga), boron (B), arsenic (As), zirconium (Zr), and mixtures thereof. Any suitable coating method may be used for a process of forming a coating layer as long as coating may be performed by a method (e.g., spray coating, or dipping) that does not adversely affect the physical properties of the cathode active material due to using such coating elements on the above-described compounds. Details of the coating method can be determined by one of skill in the art without undue experimentation.

In particular, the cathode active material may be a lithium salt of transition metal oxide having a layered rock-salt type structure among the above exemplary cathode active materials. In the present specification, the expression "layered" denotes a shape of a thin sheet, and the expression "rock-salt type structure" denotes a sodium chloride-type structure as one of crystal structures in which face-centered cubic lattices respectively formed of anions and cations are shifted by only a half of the side of each unit lattice. Examples of the lithium salt of transition metal oxide having a layered rock-salt type structure may be lithium salts of ternary transition metal oxides expressed as $Li_{1-y-z}Ni_xCo_yAl_zO_2$ (NCA) or $Li_{1-y-z}Ni_xCo_yMn_zO_2$ (NCM) (where $0 < x < 1$, $0 < y < 1$, $0 < z < 1$, $x + y + z = 1$).

A cathode layer binder, for example, may be a non-polar resin that does not have a polar functional group. Therefore, the cathode layer binder may be inactive to a highly reactive solid-state electrolyte, particularly, a sulfide-based solid-state electrolyte. The cathode layer binder, for example, may include the above-described first binder. Since the electrolyte of the solid-state battery 1 is a highly reactive sulfide-based solid-state electrolyte, the cathode layer binder may be a non-polar resin.

It is possible that the cathode layer 4 may not be sufficiently bonded to the cathode current collector 2, even in a case where the cathode layer 4 is formed to be directly bonded to the cathode current collector 2. Therefore, the adhesive layer 3 including the first binder and the third binder may be disposed between the cathode layer 4 and the cathode current collector 2. Accordingly, since the first binder in the adhesive layer 3 is strongly bonded to the cathode layer 4 and the third binder in the adhesive layer 3 is strongly bonded to the cathode current collector 2, the cathode current collector 2 and the cathode layer 4 may be strongly bonded together. Herein, in a case where the first binder is included as the cathode layer binder, the cathode layer 4 and the cathode current collector 2 may be strongly bonded together by the interdiffusion between the first binder in the adhesive layer 3 and the first binder in the cathode layer 4 through the interface between the adhesive layer 3 and the cathode layer 4.

A ratio of amounts of the sulfide-based solid-state electrolyte in the cathode, the cathode active material, the cathode layer conductive material, and the cathode layer binder is not particularly limited. For example, the amount of the sulfide-based solid-state electrolyte may be in a range of about 20 wt % to about 50 wt %, based on a total weight of the cathode layer 4, the amount of the cathode active material may be in a range of about 45 wt % to about 75 wt %, based on the total weight of the cathode layer 4, the amount of the cathode layer conductive material may be in a range of about 1 wt % to about 10 wt %, based on the total weight of the cathode layer 4, and the amount of the cathode layer binder may be in a range of about 0.5 wt % to about 4 wt %, based on the total weight of the cathode layer 4.

The electrolyte layer 5 may include a sulfide-based solid-state electrolyte and an electrolyte binder. The electrolyte binder is a non-polar resin that does not have a polar functional group. Therefore, the electrolyte binder may be inactive to a highly reactive solid-state electrolyte, particularly, a sulfide-based solid-state electrolyte. The electrolyte binder, for example, may include the first binder.

The cathode layer 4 and the electrolyte layer 5 may be strongly bonded together by the interdiffusion between the first binder in the electrolyte layer 5 and the first binder in the cathode layer 4 through the interface between the cathode layer 4 and the electrolyte layer 5. Also, a ratio of amounts of the sulfide-based solid-state electrolyte and the electrolyte binder is not particularly limited. For example, the amount of the sulfide-based solid-state electrolyte may be in a range of about 95 wt % to about 99.9 wt %, based on a total weight of the electrolyte layer 5, and the amount of the electrolyte binder may be in a range of about 0.5 wt % to about 5 wt %, based on the total weight of the electrolyte layer 5.

The anode layer 6 may include an anode active material, an anode binder, and a solid-state electrolyte. The anode binder may include the above-described first binder. The anode layer 6 and the solid-state electrolyte layer 5 may be strongly bonded together by the interdiffusion between the first binder in the anode layer 6 and the first binder in the solid-state electrolyte layer 5. The anode layer 6 may include the second binder having a polar functional group as the binder in addition to the first binder. The second binder of the anode layer 6 may mainly include a highly elastic resin including a polyimide of the following Chemical Formula 1 as a representative example. The expression "highly elastic resin" denotes a resin having a tensile modulus ranging from about 2 GPa to about 15 GPa, wherein the tensile modulus, for example, is measured in accordance with JIS K7162. Examples of the highly elastic resin may be a wholly aromatic polyamide (aramid) and polyamideimide in addition to polyimide. The second binder may strongly bind the anode layer 6 and the anode current collector 7. The highly elastic resin may maintain the adhesion at an interface of the anode layer 6, particularly, an interface between the anode layer 6 and the anode current collector 7 by constraining the expansion and contraction of the anode active material during charge and discharge.

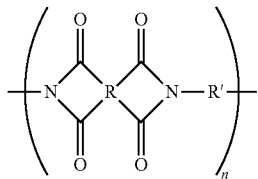

Chemical Formula 1 wherein n is about 50 to about 5,000, and R and R' are aromatic groups. The polyimide of Chemical Formula 1 may be a thermoplastic polyimide or a thermosetting polyimide. The polyimide may be obtained by heat treating a polyamic acid.

For example, polyimide may be expressed by Chemical Formula 4.

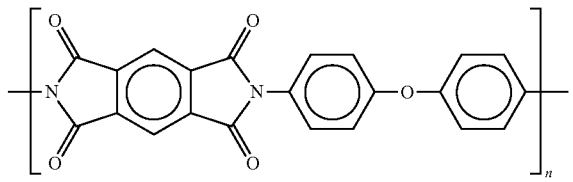

Chemical Formula 4 wherein n is about 50 to about 5,000.

The anode layer is formed, and the second binder of the anode may then be changed to have a structure of Chemical Formula 1 by a heat treatment. Specifically, a layer comprising polyamic acid may be disposed on an anode current collector, and the second binder may then be chemically changed to have a structure expressed by Chemical Formula 1 via a dehydration reaction by a heat treatment in an inert atmosphere. In a case where the second binder has the structure of Chemical Formula 1 by the heat treatment, the heating may be performed at a temperature ranging from about 100° C. to about 400° C. for several hours. For example, the heating may be performed at a temperature ranging from about 200° C. to about 350° C. for about 6 hours. The dehydration reaction of the polyamic acid may be sufficiently performed at the above temperature range, the second binder may be changed to have the structure of Chemical Formula 1, and simultaneously, the degradation of the first binder due to the heating may be prevented. An average degree of polymerization n of the second binder may be in a range of about 50 to about 5,000. In the above range of the degree of polymerization, the second binder has sufficient strength with respect to the anode current collector and simultaneously, may easily form the anode.

A ratio of amounts of the first binder and the second binder is not particularly limited. For example, the amount of the second binder may be in a range of about 50 wt % to about 99 wt %, based on a total weight of the first binder and the second binder. For example, the amount of the second binder may be in a range of about 60 wt % to about 99 wt %, based on the total weight of the first binder and the second binder. For example, the amount of the second binder may be in a range of about 70 wt % to about 99 wt %, based on the total weight of the first binder and the second binder. For example, the amount of the second binder may be in a range of about 80 wt % to about 99 wt %, based on the total weight of the first binder and the second binder. For example, the amount of the second binder may be in a range of about 85 wt % to about 99 wt %, based on the total weight of the first binder and the second binder.

The first binder and the second binder may be uniformly combined in the anode layer.

The second binder of the anode includes at least a highly elastic resin. However, the second binder of the anode may further include other components that are exemplified as the third binder in the above-described adhesive layer 3. For example, an amount of the highly elastic resin, such as polyimide, which is an example of the second binder of the anode, may be about 50 wt % or more, based on a total weight of the second binder and other components.

The anode active material may be a graphite-based material or a silicon-based material. The anode active material may also be a mixture of the graphite-based material and the silicon-based material at a suitable ratio. Since the expansion and contraction of the silicon-based active material are greater than those of the graphite-based active material, the effect of using polyimide as the second binder of the anode may be significant with respect to the silicon-based active material.

For example, the graphite-based active material may include a graphite-based material, such as artificial graphite, natural graphite, a combination of artificial graphite and natural graphite, and natural graphite coated with artificial graphite. The silicon-based active material may include Si, a Si alloy, or silicon oxide. The Si alloy is formed of a Si phase and a phase of an intermetallic compound between Si and one or more other metal elements different from Si, and the Si phase is a phase that becomes an active material, in which the active material may absorb/release Li by reversibly intercalating and deintercalating Li. The phase of the intermetallic compound between Si and other elements (Si-containing intermetallic compound phase) is closely in contact with the Si phase as an active material, and thus, the intermetallic compound phase may extend the cycle lifetime by preventing the generation of fine anode material powder by constraining a volume change (expansion/contraction) of the Si phase during charge and discharge.

The phase constraining the volume change of the Si phase uses the Si-containing intermetallic compound phase (intermetallic compound between Si and other elements), which completely or almost completely does not store Li, as a constraint phase. The other elements that form the intermetallic compound with Si are elements that may easily form a stable intermetallic compound with Si and may be at least one element selected from group 2A elements of the Periodic Table and transition metal elements. For example, the other elements may Mg, Ti, V, Cr, Mn, Co, Cu, Fe, Ni, or a combination thereof.

Also, since a contact probability between the active material phase and the constraint phase increases as metal becomes a microstructure, the generation of fine active material phase powder may be prevented, and thus, the active material may extend the cycle lifetime.

Rapid solidification is an effective method of obtaining a metal microstructure. An atomization method (including liquid atomization and gas atomization), a roll quenching method (including single-roll quenching method and twin-roll quenching method), and a rotating electrode method may be used as a solidification method by which the rapid solidification is possible. Cast pieces thus obtained are generally pulverized into a power phase and the powder phase may then be used as the anode material. The pulverization may be sufficiently performed by a typical method, such as jet milling or ball milling, and the pulverization may also be performed in a non-oxidizing atmosphere. A particle diameter of the powder is not particularly limited. However, the particle diameter thereof may be in a range of about 1 micrometer (μm) to about 35 μm.

In the anode layer 6, the sulfide-based solid-state electrolyte may swell from the electrolyte layer 5 during the preparation of the solid-state battery 1. That is, it is possible that the sulfide-based solid-state electrolyte may be included in the anode layer 6. Therefore, when the above-described second binder is included in the anode layer 6, the second binder may react with the sulfide-based solid-state electrolyte in the anode layer 6, and thus, the sulfide-based solid-state electrolyte in the anode layer 6 may degrade. However, in the solid-state battery according to the embodiment, characteristics of the solid-state battery 1 may be improved when the anode active material is a graphite-based active material, a silicon-based active material, or a combination thereof (see Examples). That is, the degradation of the solid-state battery 1 may be prevented. This means that the sulfide-based solid-state electrolyte may be omitted in the anode layer 6. In addition, it is estimated that the sulfide-based solid-state electrolyte does not swell at an interface portion between the anode layer 6 and the anode current collector 7.

Since the sulfide-based solid-state electrolyte may be omitted in the anode, the anode layer 6 may include the second binder of the anode as described above. The second binder may be strongly bonded to the anode current collector 7 via hydrogen bonds. However, the binding ability between the anode layer 6 and the electrolyte layer 5 may not be sufficient when using only the second binder. Herein, the anode layer 6 may include the first binder having affinity to the electrolyte binder that is different from the second binder. Thus, the first binder may strongly bind the electrolyte layer 5 and the anode layer 6. When the first binder is included in the electrolyte layer 5, the first binder in the anode layer 6 may strongly bind the electrolyte layer 5 and the anode layer 6 by the interdiffusion with the first binder in the electrolyte layer 5 through the interface between the anode layer 6 and the electrolyte layer 5.

Also, with respect to the anode active material, any suitable anode active material used in a lithium battery in the art may be used. For example, the anode active material may include lithium metal, a metal alloyable with lithium, transition metal oxide, non-transition metal oxide, a carbon-based material, or a combination thereof.

The anode active material may further include other active materials in addition to the above-described graphite-based active material or silicon-based active material.

Examples of the metal alloyable with lithium may be Sn, Al, Ge, lead (Pb), bismuth (Bi), antimony (Sb), an Si-M" alloy (where M" is an alkali metal, alkaline earth metal, a Group 13 element, a Group 14 element, transition metal, a rare earth element, or a combination thereof, and is not Si), an Sn-M" alloy (where M" is alkali metal, alkaline earth metal, a Group 13 element, a Group 14 element, transition metal, a rare earth element, or a combination thereof, and is not Sn). Examples of the element M" may be Mg, Ca, Sr, barium (Ba), radium (Ra), Sc, Y, Ti, Zr, hafnium (Hf), rutherfordium (Rf), V, niobium (Nb), tantalum (Ta), dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), zinc (Zn), cadmium (Cd), B, Al, Ga, Sn, indium (In), Ge, P, As, Sb, Bi, S, selenium (Se), tellurium (Te), polonium (Po), or a combination thereof.

For example, the transition metal may be lithium titanate, vanadium oxide, or lithium vanadium oxide.

For example, the non-transition metal may be $SnO_2$, or $SiO_x$ ($0<x<2$).

The carbon-based material may be crystalline carbon, amorphous carbon, or a combination thereof. The crystalline carbon may be graphite such as shapeless, plate, flake, spherical, or fibrous natural graphite or artificial graphite, and the amorphous carbon may be soft carbon (low-temperature fired carbon) or hard carbon, mesophase pitch carbide, or fired coke.

Also, a ratio of amounts of the anode active material, the first binder, and the second binder is not particularly limited. For example, the amount of the anode active material may be in a range of about 88 wt % to about 98.9 wt %, based on a total weight of the anode layer 6, the amount of the first binder may be in a range of about 0.1 wt % to about 2 wt %, based on the total weight of the anode layer 6, and the amount of the second binder may be in a range of about 1 wt % to about 10 wt %, based on the total weight of the anode layer 6.

Any suitable conductor may be used as the anode current collector 7. For example, the anode current collector 7 may be formed of copper, stainless steel, and nickel-plated steel. In addition, a suitable additive may be appropriately added to each layer.

2. Preparation Method of Solid-state Battery

Next, a preparation method of the solid-state battery 1 according to an exemplary embodiment will be further described. First, an adhesive layer coating solution that includes a first binder, a third binder, an adhesive layer conductive material, and a first solvent for dissolving the first binder and the third binder is prepared. Herein, examples of the first solvent may be amide solvents such as N-methylpyrrolidone ("NMP"), N,N-dimethylformamide ("DMF"), and N,N-dimethylacetamide, alkyl ester solvents such as butyl acetate and ethyl acetate, ketone solvents such as acetone, methylethylketone, and methylisobutylketone, ether solvents such as tetrahydrofuran and diethyl ether, and alcohol solvents such as methanol, ethanol, and isopropyl alcohol. As will be further described below, since the adhesive layer 3 does not include a sulfide-based solid-state electrolyte or includes only a small amount of the sulfide-based solid-state electrolyte from the cathode layer 4, a polar solvent can be used as the first solvent. That is, it has been surprisingly found that the first solvent can dissolve the first binder and the third binder.

Next, the adhesive layer 3 is formed by coating the cathode current collector 2 with the adhesive layer coating solution and drying the coated cathode current collector 2. Also, an adhesive film is formed by coating a substrate with the adhesive coating solution by using a desktop screen printer and drying the coated substrate. Then, the adhesive film may be pressed on the cathode current collector 2.

Thereafter, a cathode layer coating solution that includes a sulfide-based solid-state electrolyte, a cathode active material, a cathode layer conductive material, and a second solvent for dissolving a cathode layer binder is prepared. The second solvent dissolves the cathode layer binder (e.g., the first binder), but does not dissolve the third binder. Specifically, the second solvent is a non-polar solvent and for example, may include aromatic hydrocarbons, such as xylene, toluene, ethylbenzene, or a combination thereof, and aliphatic hydrocarbons, such as pentane, hexane, heptane, or a combination thereof. Next, the cathode layer 4 is formed by coating the adhesive layer 3 with the cathode layer coating solution and drying the coated adhesive layer 3. Accordingly, since the first binder in the adhesive layer 3 swells in the cathode layer 4 due to the dissolution of the first binder in the second solvent, the bonding between the adhesive layer 3 and the cathode layer 4 may become stronger. In the exemplary embodiment, since the cathode 10 is formed by coating, the large-area cathode 10 may be easily prepared. That is, in the present embodiment, the solid-state battery 1 having high capacity may be easily prepared.

Also, since the second solvent does not dissolve the third binder, the swelling of the third binder of the adhesive layer 3 into the cathode layer 4 may be prevented when the adhesive layer 3 is coated with the cathode layer coating solution. Thus, the degradation of the sulfide-based solid-state electrolyte in the cathode layer 4 by the third binder may be prevented. A cathode structure including the cathode current collector 2, the adhesive layer 3, and the cathode layer 4 is formed by the above processes.

An anode layer coating solution including a first binder, a second binder, an anode active material, and a first solvent is prepared. Since the sulfide-based solid-state electrolyte may be omitted from the anode layer 6, a polar solvent may be used as the first solvent. Next, the anode layer 6 is formed by coating the anode current collector 7 with the anode layer coating solution and drying the coated anode current collector 7. Therefore, the anode structure is formed.

Next, an electrolyte coating solution including a sulfide-based solid-state electrolyte, an electrolyte binder, and a second solvent is prepared. The second solvent dissolves the electrolyte binder (e.g., the first binder), but does not dissolve the second binder. Thereafter, the electrolyte layer 5 is formed by coating the anode layer 6 with the electrolyte layer coating solution and drying the coated anode layer 6. Accordingly, since the first binder in the anode layer 6 swells in the electrolyte layer 5 due to the dissolution of the first binder in the second solvent, the bonding between the electrolyte layer 5 and the anode layer 6 may become stronger. Also, since the second solvent does not dissolve the second binder, the swelling of the second binder of the anode layer 6 in the electrolyte layer 5 may be prevented when the anode layer 6 is coated with the electrolyte layer coating solution. Thus, the degradation of the sulfide-based solid-state electrolyte in the electrolyte layer 5 by the second binder may be prevented.

Next, the solid-state battery 1 is formed by pressing sheets that are formed from the cathode structure, the electrolyte layer 5, and the anode structure. Since each layer of the solid-state battery 1 is formed by coating, the area of each layer may be easily increased. That is, the solid-state battery 1 having high capacity may be easily prepared.

Embodiments are described in more detail, according to the following examples and comparative examples.

EXAMPLES

Next, examples of the present embodiment will be described. In addition, processes for each example and comparative example were all performed in a dry room at a dew point of about 55° C. or less.

Example 1

Adhesive Layer Formation

Graphite (KS-4, Timcal, hereinafter the same), acetylene black (DENKA, hereinafter the same) as an adhesive layer conductive material, a styrene-based thermoplastic elastomer (hereinafter, referred to as "binder A") (S.O.E1611, Asai Kasei Corporation, hereinafter the same) as a first binder, and acid modified polyvinylidene fluoride ("PVDF") (hereinafter, referred to as "binder B") (KF9200, Kureha Corporation, hereinafter the same) as a third binder were weighed at a weight percent ratio of about 60:10:15:15. Then, the above materials and an appropriate amount of NMP were introduced into a planetary mixer and mixed at about 3,000 revolutions per minute ("RPM") for about 5 minutes to prepare an adhesive layer coating solution.

Next, an about 20 micrometer (μm) thick aluminum foil current collector, as the cathode current collector 2, was disposed on a desktop screen printer (Newlong Seimitsu Kogyo Co., Ltd., hereinafter the same), and the aluminum foil current collector was coated with the adhesive layer coating solution using an about 400 mesh screen. Subsequently, the cathode current collector 2 coated with the adhesive layer coating solution was vacuum dried at about 80° C. for about 12 hours. Thus, the adhesive layer 3 was formed on the cathode current collector 2. A thickness of the adhesive layer 3 after the drying was about 7 μm.

Cathode Layer Formation

LiNiCoAlO$_2$ ternary powder as a cathode active material, Li$_2$S—P$_2$S$_5$ (about 80 mol %: about 20 mol %) amorphous powder as a sulfide-based solid-state electrolyte, and vapor-grown carbon fiber powder as a cathode layer conductive material (conductive auxiliary) were weighted at a weight percent ratio of about 60:35:5 and the above powders were mixed using a planetary mixer.

Subsequently, a primary mixed solution was prepared by adding a xylene solution, in which binder A as a cathode layer binder was dissolved, to the mixed powder in an amount of about 1.0 wt %, based on a total weight of binder A and the mixed powder. Also, a secondary mixed solution was prepared by adding an appropriate amount of dehydrated xylene for viscosity adjustment to the primary mixed solution. Also, in order to improve the dispersion of the mixed powders, zirconia balls having a diameter of about 5 millimeter (mm) were introduced into the secondary mixed solution so that each of the empty space, the mixed powders, and the zirconia balls occupied one-third of a total volume of mixing container. A tertiary mixed solution thus prepared was introduced into the planetary mixer and mixed at about 3,000 RPM for about 3 minutes to prepare a cathode layer coating solution.

Next, a sheet composed of the cathode current collector 2 and the adhesive layer 3 was disposed on a desktop screen printer, and the sheet was coated with the cathode layer coating solution using an about 150 μm thick metal mask. Thereafter, the sheet coated with the cathode layer coating solution was dried on a hot plate at about 40° C. for about 10 minutes, and then vacuum dried at about 40° C. for about 12 hours. Thus, the cathode layer 4 was formed on the adhesive layer 3. A total thickness of the cathode current collector 2, the adhesive layer 3 and the cathode layer 4 after the drying was about 165 μm.

Subsequently, a cathode structure was formed by rolling the sheet formed of the cathode current collector 2, the adhesive layer 3 and the cathode layer 4 using a roll press having a roll gap of about 10 μm. A thickness of the cathode structure was about 120 μm.

Anode layer Formation

Graphite powder (vacuum dried at about 80° C. for about 24 hours) as an anode active material, binder A as a first binder, and binder C (polyamic acid type polyimide resin, HCI1000S, Hitachi Chemical Co., Ltd., elastic modulus of about 2.5 GPa) as a second binder were weighed at a weight percent ratio of about 94.5:0.5:5.0. The above materials and an appropriate amount of NMP were introduced into a planetary mixer and mixed at about 3,000 rpm for about 3 minutes. Then, an anode layer coating solution was prepared by performing a degassing treatment for about 1 minute.

Next, an about 16 μm thick copper foil current collector was prepared as the anode current collector 7, and the copper foil current collector was coated with the anode layer coating solution using a blade. A thickness (gap) of the anode layer coating solution on the copper foil current collector was about 150 μm.

The sheet coated with the anode layer coating solution was put in a dryer heated at about 80° C. and dried for about 20 minutes. Thereafter, an anode structure was formed by rolling the sheet formed of the anode current collector 7 and the anode layer 6 using a roll press having a roll gap of about 10 μm. A thickness of the anode structure was about 100 μm. Subsequently, the rolled sheet was vacuum heated to about 300° C. for about 2 hours. Thus, the anode layer 6 is formed, in which binder C is imidized.

Electrolyte Layer Formation

A primary mixed solution was prepared by adding a xylene solution of binder A (electrolyte binder) to Li$_2$S—P$_2$S$_5$ (about 80 mol %: about 20 mol %) amorphous powder as a sulfide-based solid-state electrolyte so that an amount of binder A is about 1 wt % based on a weight of the amorphous powder. A secondary mixed solution was prepared by adding an appropriate amount of dehydrated xylene beneficial to viscosity adjustment to the primary mixed solution. Also, in order to improve the dispersion of the mixed powders, zirconia balls having a diameter of about 5 mm were introduced into the secondary mixed solution so that each of empty space, the mixed powders, and the zirconia balls occupied one-third of a total volume of each mixing container. A tertiary mixed solution thus prepared was introduced into the planetary mixer and mixed at about 3,000 rpm for about 3 minutes to prepare an electrolyte layer coating solution.

Next, an anode structure was disposed on a desktop screen printer, and the anode structure was coated with the electrolyte layer coating solution using an about 200 μm thick metal mask. Thereafter, the sheet coated with the electrolyte layer coating solution was dried on a hot plate at about 40° C. for about 10 minutes, and then vacuum dried at about 40° C. for about 12 hours. Thus, the electrolyte layer 5 was formed on the anode structure. A thickness of the dried electrolyte layer 5 was about 130 μm.

Solid-state Battery Formation

A sheet formed of the anode structure and the electrolyte layer 5, and the cathode structure were respectively cut with a Thomson blade. Then, a single cell (unit cell) of the solid-state battery 1 was formed by bonding the electrolyte layer 5 of the sheet and the cathode layer 4 of the cathode structure together by a dry lamination method using a roll press having a roll gap of about 50 μm.

Example 2

Cathode Structure Formation

A cathode structure was formed in the same manner as in Example 1.

Anode layer Formation

Si alloy powder (vacuum dried at about 80° C. for about 24 hours) as an anode active material, binder A as a first binder, and binder C (polyamic acid type polyimide resin, HCI1000S, Hitachi Chemical Co., Ltd., elastic modulus of about 2.5 GPa) as a second binder were weighed at a weight percent ratio of about 94.5:0.5:5.0. The above materials and an appropriate amount of NMP were introduced into a planetary mixer and mixed at about 3,000 rpm for about 3 minutes. Then, an anode layer coating solution was prepared by performing a degassing treatment for about 1 minute.

Next, an about 16 μm thick copper foil current collector was prepared as the anode current collector 7, and the copper foil current collector was coated with the anode layer coating solution using a blade. A thickness (gap) of the anode layer coating solution on the copper foil current collector was about 100 μm.

The sheet coated with the anode layer coating solution was put in a dryer heated at about 80° C. and dried for about 20 minutes. Thereafter, an anode structure was formed by rolling the sheet formed of the anode current collector 7 and the anode layer 6 using a roll press having a roll gap of about 10 μm. A thickness of the anode structure was about 70 μm. Subsequently, the rolled sheet was vacuum heated to about 300° C. for about 2 hours. Thus, the anode layer 6 is formed, in which binder C is imidized.

Electrolyte Layer Formation

An electrolyte layer was formed in the same manner as in Example 1.

Solid-state Battery Formation

A single cell of a solid-state battery was formed in the same manner as in Example 1.

Comparative Example 1

Cathode Structure Formation

A cathode structure was formed in the same manner as in Example 1.

Anode layer Formation

An anode structure having a thickness of about 100 μm was formed in the same manner as in Example 1, except that the second binder was changed to binder B and vacuum heating after rolling was performed at about 80° C. for about 24 hours.

Electrolyte Layer Formation

An electrolyte layer was formed in the same manner as in Example 1.

Solid-state Battery Formation
A single cell of a solid-state battery was formed in the same manner as in Example 1.

Comparative Example 2

Cathode Structure Formation

Figure 2:
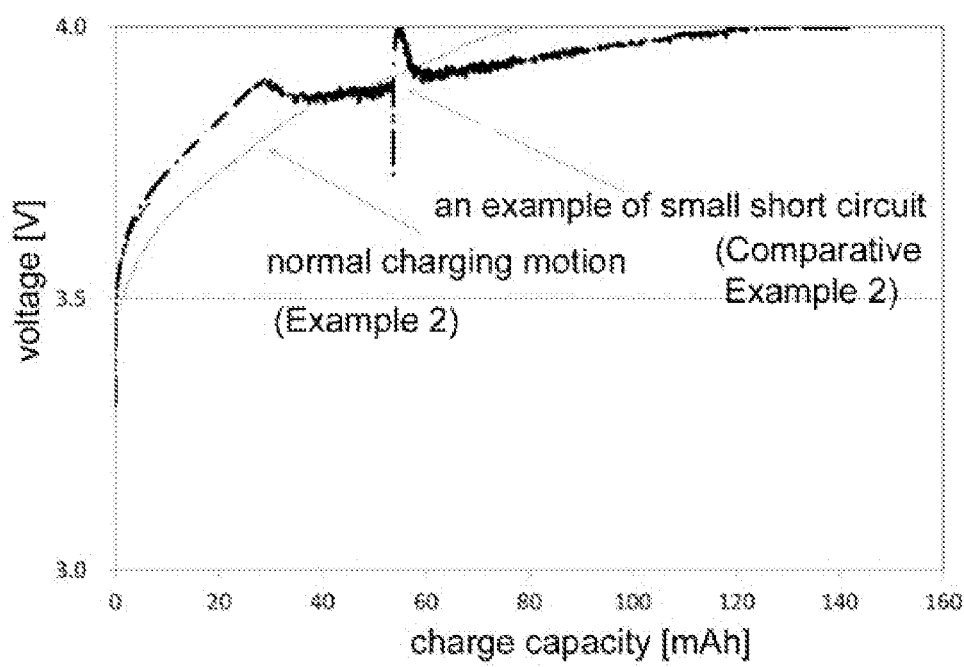
FIG. 2 is a graph of voltage (Volts, V) versus charge capacity (milliampere-hours, mAh) illustrating a relationship between charge capacity and voltage of solid-state batteries according to examples and comparative examples.

A cathode structure was formed in the same manner as in Example 1.
Anode layer Formation
An anode structure was formed in the same manner as in Example 2, except that an amount of binder C as the second binder was changed to about 5.5 wt %.
Electrolyte Layer Formation
An electrolyte layer was formed in the same manner as in Example 1.
Solid-state Battery Formation
A single cell of a solid-state battery was formed in the same manner as in Example 1.
Battery Characteristics Test Discharge capacity (mAh) was measured on each single cell prepared as above by charging each single cell at a constant current density of about 0.05 mA/cm$^2$ and then discharging using a TOSCAT-3100 charging and discharging evaluation system by Toyo System Co., Ltd. (upper charge voltage limit: about 4.0 V, lower discharge voltage limit: about 2.5 V). Current densities respectively corresponding to 0.025 C, 0.05 C, 0.075 C, 0.1 C, and 0.15 C were calculated based on the measured discharge capacities. Also, 1 C denotes 1 hour rate current (mA). Each single cell was charged at the current densities thus calculated, and the presence of an internal short circuit was then determined from a charge profile. FIG. 2 illustrates an example. With respect to a normally charged cell, a single cell voltage was monotonically increased during the charging. In contrast, with respect to a single cell in which a micro internal short circuit occurred, a single cell voltage was not stably increased during the charging. The results of evaluating the internal short circuit of each single cell are presented in Table 1.
Cycle Characteristics Test Charge and discharge cycle tests were performed at a 0.05 C constant current rate at room temperature to evaluate capacity retention ratios with respect to discharge capacity in the 1$^{st}$ cycle. The results of Examples and Comparative Examples are presented in Table 1. In Comparative Example 1, polyimide ("PI") as the second binder was not included in the anode layer, and a micro internal short circuit accompanying the precipitation of lithium dendrites occurred as a charging current value increased. Thus, the voltage became unstable and battery characteristics were poor in comparison to Example 1.

The first binder and PI (binder C) were included in both Examples 1 and 2, and charge characteristics and cycle lifetime characteristics thereof were improved. In contrast, with respect to Comparative Example 2, since the anode layer included PI but did not include the first binder, a micro internal short circuit accompanying the precipitation of lithium dendrites occurred as a charging current value increased. Thus, the voltage became unstable and battery characteristics were poor in comparison to Example 2. Also, with respect to Comparative Example 2 in which the first binder was not included, cycle lifetime characteristics degraded in comparison to Example 2 in which the first binder was included. Since PI was not included in Comparative Example 1, a micro internal short circuit accompanying the precipitation of lithium dendrites occurred as a charging current value increased. Thus, cycle lifetime characteristics significantly degraded.

TABLE 1

| | | Example 1 | Example 2 | Comparative Example 1 | Comparative Example 2 |
|---|---|---|---|---|---|
| Binder | First | SB | SB | SB | |
| | Second | PI | PI | PVDF | PI |
| Anode active material | | Graphite | Si alloy | Graphite | Si alloy |
| Charging current | 0.025 C | ○ | ○ | ○ | ○ |
| | 0.05 C | ○ | ○ | Short circuit | ○ |
| | 0.075 C | ○ | ○ | Short circuit | Short circuit |
| | 0.1 C | ○ | ○ | Short circuit | Short circuit |
| | 0.15 C | Short circuit | ○ | Short circuit | Short circuit |
| Cycle lifetime characteristics | Capacity retention ratio | — | 97% | — | 79% |

As described above, since the anode layer 6 of the exemplary embodiment, i.e., the anode, may include the first binder that was inactive to the solid-state electrolyte, the second binder that had better adhesion to the anode current collector than the first binder, and the anode active material by bonding to the electrolyte layer 5 including a sulfide-based solid-state electrolyte, and the second binder was formed of a highly elastic resin such as PI, the adhesion at the interface between the anode and the solid-state electrolyte or the interface between the anode and the anode current collector may be improved even if the charge and discharge of the solid-state battery were repeated.

As described above, according to the one or more of the above embodiments, a solid-state battery having a long lifetime may be provided by significantly improving the adhesion at an interface of an anode, even in a case where a silicon-based active material is used in the anode.

It should be understood that the exemplary embodiments described herein should be considered in a descriptive sense only and not for purposes of limitation. Descriptions of features, advantages, or aspects within each embodiment should typically be considered as available for other similar features, advantages or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. A solid-state battery comprising:
a cathode comprising a first solid electrolyte;
an anode; and
a solid-state electrolyte layer comprising a solid-state electrolyte, wherein the solid-state-state electrolyte layer is disposed between the cathode and the anode, wherein
the anode comprises an anode active material, a first binder, and a second binder,
the first binder is inactive to the second solid-state electrolyte, and
the second binder has a binding force which is greater than a binding force of the first binder, wherein an amount of the second binder is greater than an amount of the first binder, and wherein the first solid electrolyte is the same as or different from the second solid electrolyte.

2. The solid-state battery of claim 1, wherein a tensile modulus of the second binder is in a range of about 2 gigaPascals to about 15 gigaPascals.

3. The solid-state battery of claim 1, wherein the second binder is a polar resin including a polar functional group.

4. The solid-state battery of claim 1, wherein the second binder comprises a polyimide that is expressed by Chemical Formula 1:

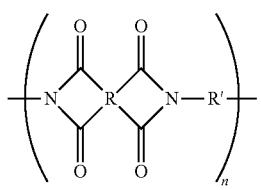

Chemical Formula 1 wherein n is about 50 to about 5,000, and R and R' are aromatic groups.

5. The solid-state battery of claim 1, wherein the second binder comprises a polyimide expressed by Chemical Formula 2:

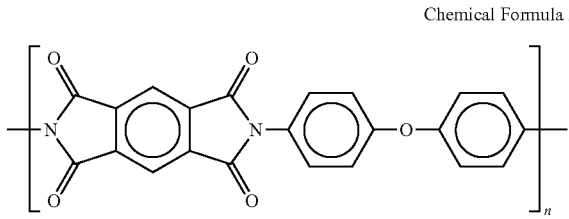

Chemical Formula 2 wherein n is about 50 to about 5,000.

6. The solid-state battery of claim 1, wherein an amount of the second binder is in a range of about 1 weight percent to about 10 weight percent, based on a total weight of the anode.

7. The solid-state battery of claim 1, wherein the first binder is a non-polar thermoplastic resin that does not include a polar functional group.

8. The solid-state battery of claim 1, wherein the first binder is a styrene-butadiene block copolymer, a styrene-ethylene-butadiene-styrene block copolymer, a styrene-styrene butadiene-styrene block copolymer, a styrene-butadiene rubber, a butadiene rubber, a natural rubber, an isoprene rubber, an ethylene-propylene-diene terpolymer, a polystyrene, a polyolefin, a polycycloolefin, a silicone resin, a hydrogenated product thereof, or a combination thereof.

9. The solid-state battery of claim 1, wherein an amount of the first binder is in a range of about 0.1 weight percent to about 2 weight percent, based on the total weight of the anode.

10. The solid-state battery of claim 1, wherein an anode active material of the anode comprises graphite, a metal, or a combination thereof.

11. The solid-state battery of claim 10, wherein the anode active material comprises silicon.

12. The solid-state battery of claim 1, wherein the anode does not comprise the solid-state-state electrolyte.

13. The solid-state battery of claim 1, wherein the solid-state electrolyte layer comprises a sulfide solid-state electrolyte.

14. The solid-state battery of claim 13, wherein the sulfide solid-state electrolyte comprises $Li_2S$—$P_2S_5$.

15. The solid-state battery of claim 1, wherein the solid-state electrolyte layer comprises the first binder.

16. The solid-state battery of claim 1, wherein the solid-state electrolyte layer comprises a non-polar thermoplastic resin that does not include a polar functional group.

17. The solid-state battery of claim 1, further comprising an adhesive layer disposed on the cathode.

18. The solid-state battery of claim 17, wherein the adhesive layer comprises the first binder and a third binder, wherein the third binder has a binding force which is greater than the binding force of the first binder.

19. The solid-state battery of claim 18, wherein the third binder comprises a nitrile rubber, a chloroprene rubber, a polyacrylic acid ester copolymer, a polyvinylidene fluoride, a vinylidene fluoride-hexafluoropropylene copolymer, a chlorinated polyethylene, a polymethacrylic acid ester, a polyvinyl alcohol, an ethylene-vinyl alcohol copolymer, a polyimide, a polyamide, a polyamideimide, a hydrogenated product thereof, a carboxylic acid modified product thereof, or a combination thereof.

* * * * *